`United States Patent` [19]

Gallo

[11] 3,886,278

[45] *May 27, 1975

[54] AMMONIUM CARBOXYLATE SEBUM INHIBITION PROCESS

[75] Inventor: Duane Gordon Gallo, Evansville, Ind.

[73] Assignee: Mead Johnson & Company, Evansville, Ind.

[ * ] Notice: The portion of the term of this patent subsequent to Aug. 28, 1990, has been disclaimed.

[22] Filed: Aug. 22, 1973

[21] Appl. No.: 390,456

[52] U.S. Cl. ............... 424/267; 424/244; 424/248; 424/249; 424/258; 424/273; 424/274
[51] Int. Cl.$^2$ ........................................ A61K 27/00
[58] Field of Search ............ 424/317, 267, 248, 244

[56] References Cited
OTHER PUBLICATIONS

Pattendon et al., J. Chem. Soc., C, 1968 (16), 1997–2006.
Wiley, J. Chem. Soc., 1958, 3831–3838.
Chemical Abstracts, 44:583(e), 1950.
Chemical Abstracts, 45:1546(d), 1951.
Chemical Abstracts, 55:1534(i), (1955).
Chemical Abstracts, 61:13168(f), (1964).
Chemical Abstracts, 61:13355(b), (1964).
Chemical Abstracts, 64:14125(c), (1966).

*Primary Examiner*—Stanley J. Friedman
*Assistant Examiner*—Norman A. Drezin
*Attorney, Agent, or Firm*—Robert E. Carnahan; Robert H. Uloth

[57] ABSTRACT

The ammonium and amine salts of 3-methyl-5-phenyl-2-trans-4-trans-pentadienoic acid and of the 2-lower alkyl-3-methyl-5-phenyl-2-trans-4-trans-pentadienoic acids when applied locally to the skin where excess sebum production occurs have the capacity of reducing the sebum production and thereby alleviating conditions correlary to the excess production of sebum such as acne.

10 Claims, No Drawings

AMMONIUM CARBOXYLATE SEBUM INHIBITION PROCESS

FIELD OF THE INVENTION

This invention involves a process of the drug bio-affecting and body treating type employing an organic compound containing composition in which the active ingredient is the ammonium or an amine salt of a carboxylic acid of a specific class of homologous substituted 5-phenylpentadienoic acids.

BACKGROUND OF THE INVENTION

Sebum, which is the major component of skin lipid, is a substance produced by sebaceous glands. As adolescents approach puberty, there is an increase in sebaceous glandular activity resulting in an increased production of sebum. This increase of sebum is considered to be an underlying cause of the high incidence of acne vulgaris noted at the onset of puberty.

Methods which heretofor have been used to control the quantity of sebum produced by the sebaceous glands include suppression of sebum production by treatment with an estrogen, and exfoliative X-ray treatment which produces a shrinkage of sebaceous glands with a corresponding decrease in sebum production. While these are effective methods, they represent heroic measures which are not altogether acceptable for routine treatment because of undesirable and sometimes dangerous side effects.

Another method for reducing sebum production has been reported by J. S. Strauss, et al., J. Invest. Derm., 48, 492 (1967). This method comprises administration of eicosa-5:8:11:14-tetraynoic acid to acne patients with a resulting decrease in sebaceous cellular activity and concomitant improvement of the acne lesions.

In my co-pending application Ser. No. 98,192 filed Dec. 14, 1970, now U.S. Pat. No. 3,755,604, there is disclosed a process for reducing sebum production by the sebaceous cells of the skin by local treatment thereof with a specific group of homologous 5-phenylpentadienoic acids. The present invention is concerned with a similar process in which the ammonium or an amine salt of one of the acids of this group is employed.

SUMMARY OF THE INVENTION

This invention concerns a process for reducing sebum production by the sebaceous glands of a mammal where excessive production of sebum thereby results in a pathological or undesirable cosmetic condition. The process comprises contacting the sebaceous gland in the skin of the mammal with an amount of an ammonium or amine salt of an acid characterized by Formula I which is effective to reduce the excess sebum production by the sebaceous glands, yet which causes no significant deleterious result. This amount which causes the desired therapeutic effect without significant toxic effect is known as an "effective amount."

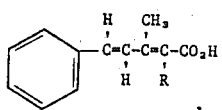

Formula I

In Formula I both carbon carbon double bonds have the transconfiguration, and R represents a hydrogen atom or a lower alkyl group having from 1 to 3 carbon atoms including the methyl, ethyl, propyl, and isopropyl groups. These pentadienoic acids are made according to methods disclosed by R. H. Wiley, et al., J. Chem. Soc., 3831 (1958) and J. Am. Chem. Soc., 29, 2986 (1964). The ammonium and amine salts of the following pentadienoic acids are particularly concerned for use in the process of the present invention.

3-Methyl-5-phenyl-2-trans-4-trans-pentadienoic acid
2,3-Dimethyl-5-phenyl-2-trans-4-trans-pentadienoic acid
2-Ethyl-3-methyl-2-trans-4-trans-pentadienoic acid
2-n-Propyl-3-methyl-2-trans-4-trans-pentadienoic acid
2-Isopropyl-3-methyl-2-trans-4-trans-pentadienoic acid The ammonium and amine salts of 3-methyl-5-phenyl-2-trans-4-trans-pentadienoic acid and 2,3-dimethyl-5-phenyl-2-trans-4-trans-pentadienoic acid are preferred with the former being particularly preferred.

The pharmaceutically acceptable ammonium and amine salts of the foregoing carboxylic acids which are employed in the present invention are those in which the cationic portion, that is the nitrogenous portion derived from ammonia or the salt forming amine, is substantially inert pharmacologically and toxicologically. While the cationic portion of the salt contributes to the utility of these active ingredients as a result of the physical properties of the salt for pharmaceutical reasons, the nitrogenous portion in itself is pharmacologically and toxicologically inert in the amounts employed and in the manner of treatment prescribed herein. Such salts are substantially free of dermal irritation and sensitizing properties and are devoid of systemic toxicity when applied locally to the skin. By local application is meant topical application or intradermal injection into the specific lesion or area of the skin requiring treatment. The ammonium salt of each of these acids is applicable as well as the salts of the following types of amines:

a. primary, secondary, or tertiary alkyl and alkenyl amines having from 1 to 22 carbon atoms and up to 3 carbon carbon double bonds;

b. hydroxy substituted primary, secondary, and tertiary alkylamines having from 1 to 22 carbon atoms and up to 3 hydroxyl groups; and c. heterocyclic amines having from 3 to 10 carbon atoms and from 1 to 3 hereto atoms of which at least one is nitrogen.

The preferred salts are the ammonium salts and the salts prepared from alkylamines having up to 6 carbon atoms or hydroxy substituted alkylamines having up to 6 carbon atoms and 3 hydroxyl groups such as triethylamine, tris(2-hydroxyethyl)amine, and 2-hydroxyethylamine. Of the heterocyclic amines, piperidine is preferred. The salts of this preferred group are relatively insoluble substances in both water and nonpolar organic solvents, but nevertheless, have substantive qualities when applied to the skin. The hydroxy substituted amine salts such as those derived from 2-hydroxyethylamine are believed to have improved skin penetration qualities due to the ability of the hydroxyalkylamines to swell proteins such as keratin. They are also relatively insoluble substances.

The ammonium or amine salts of acids of Formula I are novel compounds, but can be prepared by conventional means known to those skilled in the art for the preparation of carboxylic acid salts. A convenient way is to dissolve the acid in an organic solvent, preferably a relatively non-polar solvent, and to add the amine thereto as a solution in the same or other appropriate solvent. A solvent or solvent combination is preferably selected in which the reactants are soluble, but in which the resulting salt is insoluble so that it may be readily recovered by filtration. Where the nitrogenous base employed is a gas such as ammonia or methylamine, the amine in the gaseous state is admitted under pressure into the solvent solution of the acid. Little purification is required if pure acid and pure amine are used as reactants. In those instances where purification is necessary, conventional means such as recrystallization or trituration with an organic solvent are useful.

In the present invention, the process for reducing sebum production is carried out by topical application of an effective amount of one or more of the ammonium or amine salts described above directly to the area to be treated and maintaining it in contact therewith. The ammonium and amine salts of Formula I may be applied as such, but preferably formulated with a topical pharmaceutical or cosmetic carrier such as a jelly, ointment, cream, lotion, solution, suspension, cleansing composition, dusting powder or aerosol. The composition is applied in such a way that the pentadienoic acid remains in intimate contact with the skin. The concentration of the active ingredient in the composition is not particularly critical, but they are generally employed in the range of about 2 to 25 percent by weight. They may also be administered intradermally in aqueous suspension to produce a rapid decrease in sebum production by the sebaceous gland.

The utility of the ammonium and amine salts of the pentadienoic acids of Formula I in reducing sebum production can be demonstrated in an assay involving the preputial gland of the male rat. The preputial gland is an organized collection of sebaceous cells and as such is useful in determining the effect of inhibitors on lipid production. The gland cell utilizes acetate or glucose as substrates in lipid synthesis, and therefore a measure of the lipid synthesizing activity of cells can be obtained by determining the amount of acetate or glucose incorporated into the lipid produced. By employing radioactive acetate-$C^{14}$ or glucose-$C^{14}$ substrates, the incorporation of $C^{14}$ into sebum can be measured. Thus, when an inhibitor of sebum production is administered along with the radioactive substrate, the amount of radioactive substrate incorporated into the sebum is less than that of a control wherein the inhibitor is not administered.

The effect on sebum production can be measured directly in man by the collection of sebum samples from the foreheads of the test subjects before and after treatment with the test agent. Refer to Maibach, H. I., et al., Biological Pathology of Pattern Alopecia, pages 171–176, Karger, Bosle/New York, (1968), and Strauss, J. S., et al. J. Invest. Derm., 36, 293 (1961) for methods of collecting and determining sebum samples. A base line sebum value is first established for each subject before treatment is commenced. The test composition or compound is then applied topically to the forehead twice daily for a period of from 21 to 28 days. Sebum production values are determined at approximately weekly intervals during the treatment period and on two consecutive days following the last treatment. Effective compounds cause statistically significant reduction in sebum production when tested by this method.

DETAILED DESCRIPTION OF THE INVENTION

Preparation 1. Ammonium 3-Methyl-5-phenyl-2-trans-4-trans-pentadienoate

Anhydrous ether, 350 ml., is saturated with anhydrous ammonia by introducing a stream of the gas from a cylinder beneath the surface thereof and allowing bubbling from the gas inlet to proceed for 5 minutes. 3-Methyl-5-phenyl-2-trans-4-trans-pentadienoic acid, 6.0 g. (0.032 mole), is then dissolved in the ether solution of ammonia and the solution set aside for 10 minutes while crystallization of the ammonium salt takes place. The product is collected and dried in vacuo for 1 hr. at 50°C. and weighed, 6.3 g. (96 percent). The product is a white crystalline solid which is purified by suspending it in about 500 ml. of ethyl acetate and stirring at room temperature for several hours. The product is collected on a filter and dried in a vacuum at room temperature, yield 5.7 g., m.p. 171°–176°C. (corr.). It is insoluble in water.

Anal. Calcd. for $C_{12}H_{12}O_2 \cdot NH_3$: C, 70.22; H, 7.37; N, 6.82. Found: C, 70.26; H, 7.32; N, 6.52.

The methylamine, and trimethylamine salts of 3-methyl-5-phenyl-2-trans-4-trans-pentadienoic acid may be prepared according to Preparation 1 by substitution of these amines for ammonia in the foregoing procedure. The ammonium, methylammonium, and trimethylammonium salts of 2,3-dimethyl-5-phenyl-2-trans-4-trans-pentadienoic acid may be prepared similarly by substitution of that acid for the 2-methyl-5-phenyl-2-trans-4-trans-pentadienoic acid.

Preparation 2. Piperidinium 3-Methyl-5-phenyl-2-trans-4-trans-pentadienoate

A solution of 6 g. (0.032 mole) of 3-methyl-5-phenyl-2-trans-4-trans-pentadienoic acid and 300 ml. of anhydrous ether is prepared and 5.45 g. (0.064 mole) of piperidine is added thereto with stirring. The desired salt separates as a crystalline precipitate which is collected on a filter, washed with anhydrous ether and dried first in the air and then in a vacuum oven at 50°C., yield 8.2 g. (94.3 percent), m.p. 185°–187°C. (corr.). A small sample recrystallized from hot ethyl acetate exhibits the same melting point. Solubility in water is 0.1 g./100 ml.

Anal. Calcd. for $C_{12}H_{12}O_2 \cdot C_5H_{11}N$: C, 74.69; H, 8.48; N, 5.12. Found: C, 74.62; H, 8.59; N, 4.81.

Substitution of triethylamine for piperidine in Preparation 2 affords triethylammonium 3-methyl-5-phenyl-2-trans-4-trans-pentadienoate. Additional heterocyclic and other amine salts of 3-methyl-5-phenyl-2-trans-4-trans-pentadienoic acid and 2,3-dimethyl-5-phenyl-2-trans-4-trans-pentadienoic acid may be prepared according to Preparation 2 employing either of those acids and any of the following amines instead of piperidine.

morpholine
indoline
1,2,3,4-tetrahydroisoquinoline
1,2,3,4-tetrahydroquinazoline
imidazolidine
triazine hexahydroazepine
1-amino-12-hydroxy-9-octadecene
1-aminooctadecane
1-amino-9-octadecene
1-aminododecane
1-amino-9-hendecene
1-aminodocosane
thiamorpholine Preparation 3. tris(2-Hydroxyethyl)ammonium 3-Methyl-5-phenyl-2-trans-4-trans-pentadienoate A solution of 5 g. (0.027 mole) of 3-methyl-5-phenyl-2-trans-4-trans-pentadienoic acid in 300 ml. of anhydrous ether is treated with a solution of 7.9 g. (0.053 mole) of triethanolamine in 30 ml. of absolute ethanol with stirring. A precipitate forms which is kept for 15 minutes with moderate stirring and then collected on a filter. It is dried in a vacuum at 40°C. for 1 hr. and then in the air overnight, yield 8.7 g. (97.3 percent), m.p. 127°–129°C. (corr.). Solubility in water is 0.1 g./100 ml.

Anal. Calcd. for $C_{12}H_{12}O_2 \cdot C_6H_{15}NO_3$: C, 64.07; H, 8.07; N, 4.15. Found: C, 63.92; H, 8.22; N, 3.94.

Preparation 4. 2-Hydroxyethylammonium 3-Methyl-5-phenyl-2-trans-4-trans-pentadienoate A quantitative yield of the desired salt may be obtained from 5.0 g. (0.027 mole) of 3-methyl-5-phenyl-2-trans-4-trans-pentadienoic acid dissolved in 50 ml. of anhydrous ether and mixed with an anhydrous ether solution of 3.7 g. (0.06 mole) of ethanolamine. The precipitated salt is collected and dried, m.p. 192°–194°C. (corr.), yield 6.6 g. Solubility in water is 0.1 g./100 ml.

Anal. Calcd. for $C_{12}H_{12}O_2 \cdot C_2H_7NO$: C, 67.45; H, 7.68; N, 5.62. Found: C, 67.16; H, 7.71; N, 5.58.

Composition 1. tris(2-Hydroxyethyl)ammonium 3-Methyl-5-phenyl-2-trans-4-trans-pentadienoate Topical Jelly A jelly-like washable base containing 10 percent tris(2-hydroxyethyl)ammonium 3-methyl-5-phenyl-2-trans-4-trans-pentadienoate suitable for topical use is prepared from the following ingredients which are sufficient for the preparation of a 1 kilogram batch of the jelly.

| | |
|---|---|
| tris(2-Hydroxyethyl)ammonium 3-Methyl-5-phenyl-2-trans-4-trans-pentadienoate, microfine | 100.0 g. |
| Carboxyvinylpolymer, TGA specification No. 81 except solution viscosity (0.5% in $H_2O$) 4,000–11,000 CPS | 10.00 g. |
| Sodium hydroxide, qs. | pH 5.0 |
| Methyl paraben | 1.2 g. |
| Propyl paraben | 0.3 g. |
| Glycerin | 50.0 g. |
| Distilled water, qs. | 1,000.0 g. |

Composition 2. 2-Hydroxyethylammonium 3-Methyl-5-phenyl-2-trans-4-trans-pentadienoate Lotion for Topical Application The following materials are combined to provide a lotion containing 2 percent of active ingredient. If desired, thickeners and perfumes may be added to obtain desired cosmetic characteristics.

| | |
|---|---|
| Ethanol | 70 ml. |
| Propylene glycol | 2 g. |
| 2-Hydroxyethylammonium 3-Methyl-5-phenyl-2-trans-4-trans-pentadienoate | 2 g. |
| Distilled water, qs. | 100 ml. |

Composition 3. Ammonium 3-Methyl-5-phenyl-2-trans-4-trans-pentadienoic acid Suspension for Intradermal Injection The following materials are combined and formed into a stable suspension by passage through a mechanical homogenizer.

| | |
|---|---|
| Ammonium 3-Methyl-5-phenyl-2-trans-4-trans-pentadienoic acid, microfine | 1.0 g. |
| Benzyl alcohol | 0.9 g. |
| Sodium carboxymethylcellulose | 0.3 g. |
| Polysorbate-80 | 0.1 g. |
| Sodium chloride, qs. isotonic | |
| Water for injection, qs. | 100.0 ml. |

The resulting suspension contains 10 mg./ml. of ammonium 3-methyl-5-phenyl-2-trans-4-trans-pentadienoic acid and is suitable for intradermal injection.

What is claimed is:

1. The process for reducing sebaceous cell sebum production in a mammal in need thereof which comprises contacting said sebaceous cell in the skin of said mammal with an amount effective to reduce sebum production thereby of a pharmaceutically acceptable ammonium or amine salt of a 2-trans-4-trans-pentadienoic acid of the formula

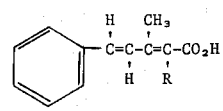

wherein R is hydrogen or lower alkyl of from 1 to 3 carbon atoms inclusive, and wherein the cationic nitrogenous portion of said salt is pharmacologically and toxicologically inert for said mammal in said amount effective to reduce sebum production.

2. The process of claim 1 wherein said amine salt is the salt of said pentadienoic acid and an amine selected from the group consisting of
   a. primary, secondary, and tertiary alkylamines having from 1 to 22 carbon atoms,
   b. primary, secondary, and tertiary alkenylamines having from 1 to 22 carbon atoms and up to 3 carbon carbon double bonds,
   c. hydroxy substituted primary, secondary, and tertiary alkylamines having from 1 to 22 carbon atoms, and up to 3 hydroxyl groups, and
   d. heterocyclic amines having from 3 to 10 carbon atoms and from 1 to 3 heteroatoms, at least one of said heteroatom being nitrogen, and wherein said effective amount of said salt to reduce sebum production is substantially free of dermal irritation and sensitizing properties and devoid of systemic toxicity when applied locally to the skin.

3. The process of claim 1 wherein the ammonium salt of said pentadienoic acid is employed.

4. The process of claim 1 wherein said pentadienoic acid is 3-methyl-5-phenyl-2-trans-4-trans-pentadienoic acid.

5. The process of claim 4 wherein said amine is an alkylamine having up to 6 carbon atoms.

6. The process of claim 4 wherein said amine is a hydroxy substituted alkylamine having up to 6 carbon atoms and up to three hydroxy groups.

7. The process of claim 1 wherein ammonium 3-methyl-5-phenyl-2-trans-4-trans-pentadienoate is employed.

8. The process of claim 1 wherein piperidinium 3-methyl-5-phenyl-2-trans-4-trans-pentadienoate is employed.

9. The process of claim 1 wherein tris(2-hydroxyethyl)ammonium 3-methyl-5-phenyl-2-trans-4-trans-pentadienoate is employed.

10. The process of claim 1 wherein 2-hydroxyethylammonium 3-methyl-5-phenyl-2-trans-4-trans-pentadienoate is employed.

* * * * *